US008027684B2

(12) United States Patent
Gupta et al.

(10) Patent No.: US 8,027,684 B2
(45) Date of Patent: Sep. 27, 2011

(54) SYSTEM FOR PERFORMING A TASK IN A COMMUNICATION NETWORK AND METHODS THEREOF

(75) Inventors: Puneet Gupta, Bangalore (IN); Kartik Muralidharan, Bangalore (IN); Zaryab Khan, Maharashtra (IN)

(73) Assignee: Infosys Technologies, Ltd., Bangalore (IN)

( * ) Notice: Subject to any disclaimer, the term of this patent is extended or adjusted under 35 U.S.C. 154(b) by 1143 days.

(21) Appl. No.: 11/504,805

(22) Filed: Aug. 16, 2006

(65) Prior Publication Data

US 2007/0067310 A1 Mar. 22, 2007

(30) Foreign Application Priority Data

Aug. 22, 2005 (IN) .......................... 1163/CHE/2005

(51) Int. Cl.
*H04W 40/00* (2009.01)
(52) U.S. Cl. ........ 455/445; 455/522; 455/461; 370/328; 370/331; 370/335; 370/395
(58) Field of Classification Search .................. 348/553, 348/552; 434/307; 710/100; 281/45, 42; 365/221; 463/25, 16; 455/522, 69, 445, 455/41.2, 418, 420, 434, 500, 507, 512–514, 455/550.1, 556.2, 558; 370/335, 331, 328, 370/395
See application file for complete search history.

(56) References Cited

U.S. PATENT DOCUMENTS

| | | | | |
|---|---|---|---|---|
| 5,970,495 A * | 10/1999 | Baru et al. ..................... 707/102 |
| 6,067,545 A * | 5/2000 | Wolff .............................. 707/10 |
| 6,611,862 B2 * | 8/2003 | Reisman ........................ 709/217 |
| 6,636,721 B2 * | 10/2003 | Threadgill et al. ........... 455/12.1 |
| 7,082,102 B1 * | 7/2006 | Wright ........................... 370/229 |
| 2002/0086706 A1 * | 7/2002 | Chen et al. .................... 455/560 |
| 2002/0198994 A1 * | 12/2002 | Patton et al. ................... 709/225 |
| 2004/0044516 A1 * | 3/2004 | Kennewick et al. .............. 704/5 |
| 2004/0103193 A1 * | 5/2004 | Pandya et al. ................. 709/224 |
| 2004/0148375 A1 * | 7/2004 | Levett et al. .................. 709/223 |
| 2004/0181788 A1 * | 9/2004 | Kester et al. .................. 717/168 |
| 2005/0105491 A1 * | 5/2005 | Chaskar et al. ............... 370/331 |
| 2005/0188217 A1 * | 8/2005 | Ghanea-Hercock .......... 713/200 |
| 2005/0226059 A1 * | 10/2005 | Kavuri et al. ............ 365/189.05 |
| 2006/0059335 A1 * | 3/2006 | Bernardi et al. .............. 713/164 |
| 2006/0083205 A1 * | 4/2006 | Buddhikot et al. ........... 370/338 |
| 2006/0099988 A1 * | 5/2006 | Velagaleti et al. ......... 455/552.1 |
| 2006/0277086 A1 * | 12/2006 | Ball et al. ......................... 705/8 |

* cited by examiner

*Primary Examiner* — Meless N Zewdu
*Assistant Examiner* — Mahendra Patel
(74) *Attorney, Agent, or Firm* — LeClairRyan, a Professional Corporation (57) ABSTRACT

A system, method, and computer program product for executing a task via a communication network, including devices configured to establish the communication network, wherein each of the devices includes a database having a capability of the devices, wherein the devices are adapted for executing a pre-defined set of activities indicative of the task. The device further includes a resource module adapted to select an optimal capability among the devices for performing the task based on the capability of the devices and a decision module adapted to allocate the task among the devices based on the selection of the optimal capability among the devices. The device further includes an execution module adapted to perform the task in any of the devices based on the allocation of the optimal capability among the devices and wherein the application resource is exchanged among the devices prior to invoking the task.

45 Claims, 4 Drawing Sheets

SYSTEM FOR PERFORMING A TASK IN A COMMUNICATION NETWORK AND METHODS THEREOF

CROSS REFERENCE TO RELATED DOCUMENTS

This application claims priority under 35 U.S.C. §119 to Indian Patent Application Serial No. 1163/CHE/2005 of Gupta et al., entitled "System for Performing a Task in a Communication Network and Methods Thereof," filed Aug. 22, 2005, the entire disclosure of which is hereby incorporated by reference herein.

BACKGROUND OF THE INVENTION

1. Field of the Invention

The invention relates generally to a communication network system and more particularly, to a mechanism for performing at least one task using multiple devices connected by the communication network.

2. Discussion of the Background

The device is defined as a mobile or a fixed device configurable to work in a wireless environment. Communication network may be categorized as both an ad-hoc communication network and a fixed communication network. Ad-hoc communication network is a short-range wireless network comprising an arbitrary collection of devices that are physically close enough to exchange information. The ad-hoc network is constructed quickly with devices as they enter and leave the proximity of the remaining devices.

Typically, each device in the communication network is adapted to provide a set of services with varying capabilities to perform multiple tasks. However, in some cases, a particular device may not have the required service to perform multiple tasks. Conventionally, technologist has invented applications that make use of and combine the specific capabilities provided by different types of devices.

Typically, this is done by following similar patterns of behavior for service discovery protocols. A service description is created using a description language and an appropriate vocabulary and is made available for query matching. Some systems advertise the service description by pushing the description to a directory and requiring the advertisers to discover the directory. Other systems advertise the service description by making the descriptions available for peer-to-peer discovery. A client device that needs to discover the service description composes a query using a query language and a matching vocabulary and uses either a query protocol or a decentralized query-processing server to deliver the query.

In addition to this, service discovery protocols in the typical systems require sending and replying to inquiry messages. If no other device is present, the inquiry messages are sent in vain. During the execution of these systems, firstly, a request is sent from a first device to a second device for enquiring on the services available, secondly, a confirmation is sent by the second device providing the list of services and finally, an application is performed on the first device using the services of the first device and the second device. However, as will be appreciated by persons skilled in the art, the above system have certain drawbacks.

Firstly, the user of the device spends considerable amount of time discovering the available external resources. To provide a true pervasive computing environment, systems should be designed around enhancing the productivity of the end user. Secondly, the connection between the device and resources are not automatically setup without any user intervention. Typically, the information is only exchanged when the user wants to execute a particular task. Thirdly, the information regarding the history, environmental parameters, device capabilities and preferences are not exchanged. Fourthly, the distribution and allocation of task among the multiple devices based on the capabilities of the devices are not done using the present method.

Accordingly, there is a need for a technique that enables performing the task using multiple devices connected by the communication network such that the device automatically identifies the optimum resource required to perform the task.

SUMMARY OF THE INVENTION

In one embodiment of the present technique, a system for executing at least one task via a communication network is disclosed. The method includes a plurality of devices configured to establish the communication network. Each of the device includes a database having at least one capability of the pluralities of devices, wherein the plurality of devices are adapted for executing a pre-defined set of activities indicative of the at least one task and a resource module adapted to select at least one optimal capability among the plurality of devices for performing the at least one task based on the at least one capability of the plurality of devices. The at least one capability is exchanged among the plurality of devices prior to invoking the at least one task. The device further includes a decision module adapted to allocate the at least one task among the plurality of devices based on the selection of the at least one optimal capability among the plurality of devices and an execution module adapted to perform the at least one task in any of the plurality of devices based on the allocation of the at least one optimal capability among the plurality of devices.

In another embodiment of the present technique, a method for executing at least one task via a communication network is disclosed. The method includes establishing the communication network between a plurality of devices, wherein each of the plurality of devices comprising a database having at least one capability of the plurality of devices and wherein the plurality of device are adapted for executing a pre-defined set of activities indicative of the at least one task. The method further includes exchanging the at least one capability among the plurality of devices prior to invoking the at least one task and selecting at least one optimal capability among the plurality of devices for performing the at least one task via a resource module. Furthermore, the method includes allocating the at least one task among the plurality of devices based on the selection of the at least one optimal capability via a decision module and performing the at least one task in any of the plurality of devices based on the allocation of the at least one optimal capability among the plurality of devices via an execution module.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE PREFERRED EMBODIMENTS

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present invention relates to a mechanism for communication between multiple devices connected to a network for improving the execution of at least one task. Task may be defined as a sequence of activities or events that need to be performed using one or more resources. An exemplary example of the task may include a collaborative work application which uses a mechanism to edit a group document by providing a voice input for editing, which gets broken down to "converting a voice input to text" and passing of the resultant text to another device which provides the service for interpreting the commands and integrating the user inputs with the group document.

Figure 1:
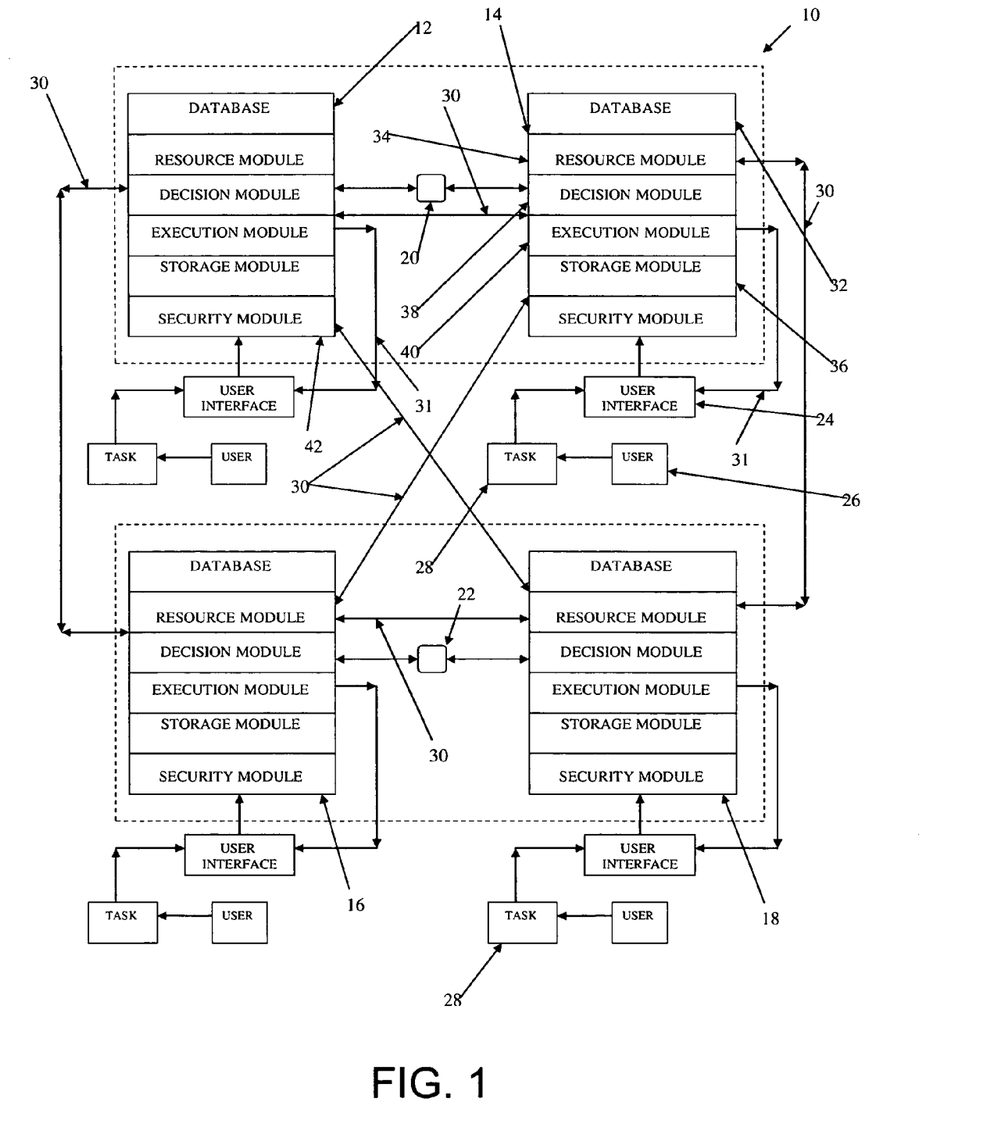
FIG. 1 is a diagrammatical representation of a system illustrating an interaction between multiple devices via a communication network, in accordance with an embodiment of the present technique.

FIG. 1 is a representation of a system 10 illustrating an interaction between multiple devices via a communication network, in accordance with an embodiment of the present technique. It should be noted that communication network includes an ad-hoc communication network or a fixed communication network, or combinations thereof. There are many types of communication networks, which includes local-area networks (LANs), wherein the devices are geographically close together (that is, in the same building). The second type of communication network is wide-area networks (WANs), wherein the devices are farther apart and are connected by telephone lines or radio waves. The third type of communication network is campus-area networks (CANs), wherein the devices are within a limited geographic area, such as a campus or military base. Lastly, metropolitan-area networks (MANs), which refer to a data network designed for a town or city.

Ad-hoc communication network is a short-range wireless network comprising an arbitrary collection of wireless devices that are physically close enough to exchange information. The device refers to mobile as well as stationary devices, which are adapted to establish connection in the communication network. It should also be noted that devices are also referred as peers in the communication network terminology.

As illustrated, the system 10 includes multiple devices (12, 14, 16, 18) configured to be connected to multiple access points (20, 22). Access point refers to radio coverage area or a region provided by a server for detecting at least one device and are operable to allow the at least one device to provide a connection with the access point for establishing the communication network. The radio coverage area or the region is also referred as a "hotspot". As will be appreciated by those skilled in the art, each of the devices is capable of establishing communication between any of the device in any of the access points. This may be through the wireless network or through the fixed communication network. This communication is generally represented by reference numeral. In the present illustration as represented in FIG. 1, the devices 12 and 14 are connected to access point 20 and likewise, the devices 16 and 18 are connected to access point 22.

In one implementation of the present technique, the system 10 includes at least one user interface 24 through which at least one user 26 provides the input indicative of a task 28 to be performed. The interface provides a snapshot of all the capabilities of any of the device. The capability of the device may include at least one of an application resource or non task execution parameters or combinations thereof. The details of the application resource and the non task execution parameters will be explained in further details in the subsequent sections to follow.

In one embodiment of the present technique, the user 26 may select the optimal capability required among the multiple devices for performing the task 28. In another embodiment of the present technique, the optimal capability may also be automatically selected by the device through which the user 26 initiates the task 28. In yet another embodiment of the present technique, the optimal capability may also be automatically selected by any of the device, which takes part in performing the task 28.

In certain implementation of the present technique, the user 26 may initiate the task 28 to be performed through the user interface 24 of a first device 14. The first device 14 may in turn divide the task 28 into multiple jobs or pass on the task 28 to any of the device in any of the access points, which in turn may again divide the task 28 into multiple jobs among other devices. The division may be based on the capabilities of each of the devices. In the present context, job may be defined as at least one portion of the task that may be required to be executed and the results combined with other such jobs for the completion of the task 28. This interaction among the devices is generally represented by reference numeral 30.

In one embodiment of the present technique, the output 31 of the job performed through a combination of many devices may then be displayed in each of the device, which performed the job or the task. In another embodiment of the present technique, instead of displaying the output 31 of the job in the respective devices, the final output 31 of the task may be displayed in the user interface of the device, which initiated the task. In yet another embodiment of the present technique, the output 31 of the task or the job may not be displayed in the any of the device but the only the task may be performed.

In order to understand and appreciate the various aspects of the present technique, the following sections provide brief introduction to the various aspects of the device. As illustrated in the FIG. 1, each device includes a database 32 having multiple capabilities for executing a pre-defined set of activities. The activities may be any task or job as assigned by the user of the device. The capability may be the functional aspects, which are provided by the device.

As discussed earlier, the capabilities of the device may be defined as a combination of application resources and non task execution parameters, with application resources as defining the services and applications available on a particular device, which may be invoked by another device and non task execution parameters defined as attributes or capabilities which have a potential impact on how an application resource gets executed. Some examples of such execution parameters may include but not limited to elements such as device processor speed and type, or currently installed operating system, or available memory, or screen resolution or other functional attributes like system load, or performance history or combinations thereof. Some of the examples of application resources may include but not limited to low end services like printing, or access to modem to high end complex services like voice to text conversion, or image processing or combinations thereof.

The information on the capabilities of each of the device may be stored in the database 32 in an extensible markup language (XML) schema. The device further includes a resource module 34 configured to select at least one optimal capability for performing at least one task. The selection may be based on the information on the capabilities of the device, which may be stored in the database 32.

The device further includes a storage module 36, wherein the information on the capability of each of the device are exchanged and stored in the storage module 36 prior to invoking the task 28. The storage module 36 may also be adapted to automatically update the information of the plurality of capabilities of the device. However, in certain implementation of the present technique, the task 28 may be executed based on the information, which was stored in the storage module 36 during some past execution of the task 28. The past record, which was stored in the storage module 36, may be used to utilize the capabilities of the various devices to execute the task 28.

Furthermore, the device includes a decision module 38 adapted to allocate the task among the multiple devices based on the selection of the optimal capability from the database 32. It should be noted that the allocation of the task 28 among the multiple devices may also be stored in the XML schema as mentioned earlier. The decision module 38 may also be adapted to randomly update the allocation of the at least one optimal capability among the plurality of devices for performing the at least one task 28. Further, the decision module 38 may be adapted to allocate the at least one optimal capability among the plurality of devices based on the non-task execution parameters.

As illustrated, the device further includes an execution module 40 and a security module 42. The execution module 40 may be adapted to perform the task 28 based on the allocation of the optimal capability. The detail of the various embodiments illustrating the allocation and the execution of the task will be explained in further sections to follow.

The security module 42 ensures that only authorized users may use the present technique to perform the task 28 and also ensures that this technique is usable only by the user 26 for which it is created. However, in one implementation of the present technique, the access may be modified at any point of time by the at least one authorized user leading the execution of the task 28. In another implementation of the present technique, the user 26 may specify their preferred authentication mechanism. In yet another implementation of the present technique, the security module 42 validates the identity of each of the user 26 before the initiation of the task 28.

Figure 2:
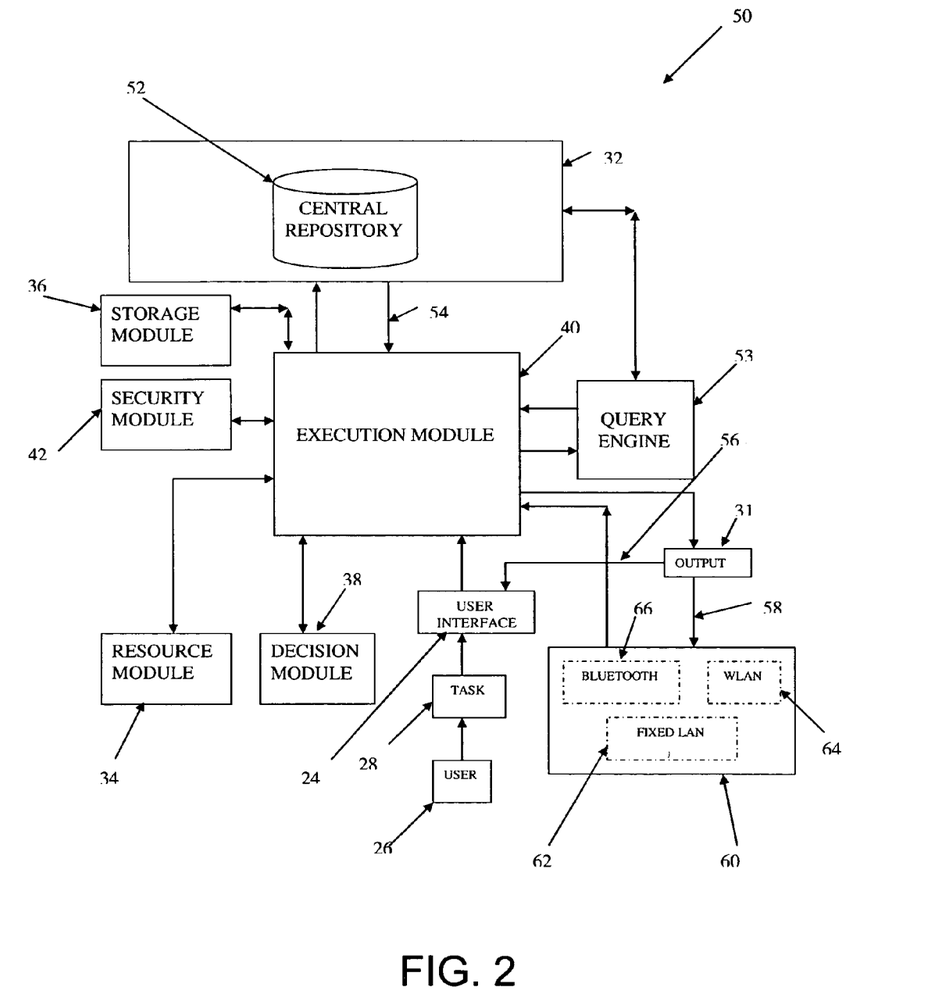
FIG. 2 is a block diagram illustrating some of the exemplary hardware and software components of a device shown in FIG. 1, in accordance with an embodiment of the present technique.

Referring now to FIG. 2, a block diagram of a system 50 illustrating some of the exemplary hardware and software components of the device shown in FIG. 1 is disclosed. As explained in earlier sections above, each of the devices includes the database 32, which stores the capabilities of the device in a central repository 52 located inside the database. The database 32 may be defined as a generic store of information relating to the capability of the device stored generally in XML schema. The central repository 52 may include a repository or collection of a specific data store program. The central repository 52 not only stores the capabilities of the device in which it is located but also acquires information on the capabilities of all capabilities of other devices and stores the information. The connection between the devices and capabilities are automatically setup without any user intervention and the capabilities of these resources as well as supported services are exchanged through a proposed XML schema. In one exemplary embodiment of the present technique, a proposed XML schema is represented below:

<system>
    <mcname>BLRKEC29075D</mcname>
    <os xmlns="Operating System">
    <version xmlns=" ">Windows NT 5.1 Build 2600</version>
    <servicepack xmlns=" ">Service Pack 2</servicepack>
    </os>
    <processor xmlns="Processor Information">
    <vendor xmlns=" ">Intel</vendor>
    <type xmlns=" ">Pentium 4 "Willamette"</type>
    <speed xmlns=" ">2795 MHz<speed>
    </processor>
    <ram xmlns="RAM Information">
    <total xmlns=" ">506</total><available xmlns=" ">177</available>
    </ram>
    <ip xmlns="IP Address">192.168.206.37</ip>
    <resolution xmlns="Screen Resolution">1024×768</resolution
    <printers xmlns="Printer Information">
    <avlbleprn xmlns="Available Printers">
    <printer xmlns=" ">Epson Stylus Photo 1270 ESC/P 2</printer>
    <printer xmlns=" ">\\blrkec1920 ps \PRT_B19FF</printer>
    </avlbleprn>
    <default xmlns="Default Printer">
    <pname xmlns=" ">\\blrkec1920 ps\PRTJ319FF</pname>
    </default>
    </printers>
    <stt xmlns="Voice to Text Conversion">
    <input xmlns"File Type">
    <type1>wav</type1>
    <type2>mp3</type2>
    <type3>wma</type3>
    </input>
    <size xmlns"Maximum File Size Kbytes">2048</size>
    <accuracy xmlns"Quality %">60</accuracy>
    </stt>
    <drives xmlns="Hard Disk">
    <drive xmlns=" ">
    C—Local Disk
    <type>Fixed<type><totalspace>21459722240<totalspace>
    <freespace>7955701760<freespace>
    <filesystem>NTFS<filesystem>
    </drive>
    </drives>
    </system>

As will be appreciated by people skilled in the art, in one embodiment of the present technique, the user 26 initiates the task 28 to be performed via the user interface 24 of any of the device. The task 28 enters the execution module 40, which takes the help of the resource module 34 and the decision module 38 for establishing a query. This query may be established in a query engine 53, which then extracts the information from the central repository 52 present in the database 32. The output 54 from the central repository 52 may then be processed in the execution module 40 to generate an output 31 of the task, which is then displayed in the user interface 24. This is represented by reference numeral 56.

In another embodiment of the present technique, the task 28 may be initiated in any other device or the task may be divided into number of jobs in any of devices. The execution module 40 then performs the task 28 similarly as explained in the earlier sections above. The output 31 of the task 28 may be sent back to the device in the communication network 60, which initiated the task 28 or may even be sent to the device, which initiated the job. This is represented by reference numeral 58. It should be noted that the output 31 generated may be controlled and monitored by a manager (not shown for clarity), which distributes the output into one of a fixed LAN device 62 or a wireless LAN device 64 or a Bluetooth device 66 or combinations thereof.

As explained in earlier sections above, the execution module 40 allocates the optimal capability among the devices in the extensible markup language. By way of example, in one exemplary embodiment of the present technique, the allocation may be represented as follows:

```
<system>
<mcname>Pocket PC</mcname>
<os xmlns="Operating System">
<version xmlns=" ">Windows Mobile 2003</version>
<servicepack xmlns=" ">.Net CF 1.1</servicepack>
</os>
<ip xmlns="IP Address">192.168.206.37</ip>
<task>
<method>sequence</method>
<task1>
<type>stt conversion</type>
<input>hello.wav</input>
<surrogate>BLRKEC29075D></surrogate>
<ip>192.168.206.21<lip>
</task1>
<task2>
<type>compression</type>
<input>task1</input>
<surrogate>BLRKEC21246</surrogate>
<ip>192.168.206.142</ip>
</task2>
</task>
</system>
```

As will be appreciated by those skilled in the art, in certain implementation of the present technique, the information on the capability of the device are stored in the storage module 36 for future use. This is because in certain cases, the same user may use certain operation multiple times.

In certain implementation of the present technique, the system 50 allows the user 26 to customize the allocation of task 28 among the multiple devices for performing the task 28. This selection may be based on the capabilities of the device and also on the past history, which is stored in the storage module 36. In this way, the user 26 may directly start executing the operation by customizing the allocation of the multiple devices for performing the task 28.

In another implementation of the present technique, the decision module 38 automatically uses extra available capability in any of the devices to improve application performance. In yet another implementation of the present technique, the decision module 38 monitors the current capability of the device and dynamically determines the best remote execution plan for a given application. To make this decision, the decision module 38 measures the supply and demand for many different resources including but not limited to bandwidth, file cache state, CPU, and battery life. In addition to this, the decision module 38 predicts the capability usage of alternative execution plans for an application. This may be done by recording the operation of the past history stored in the storage module 36.

Figure 3:
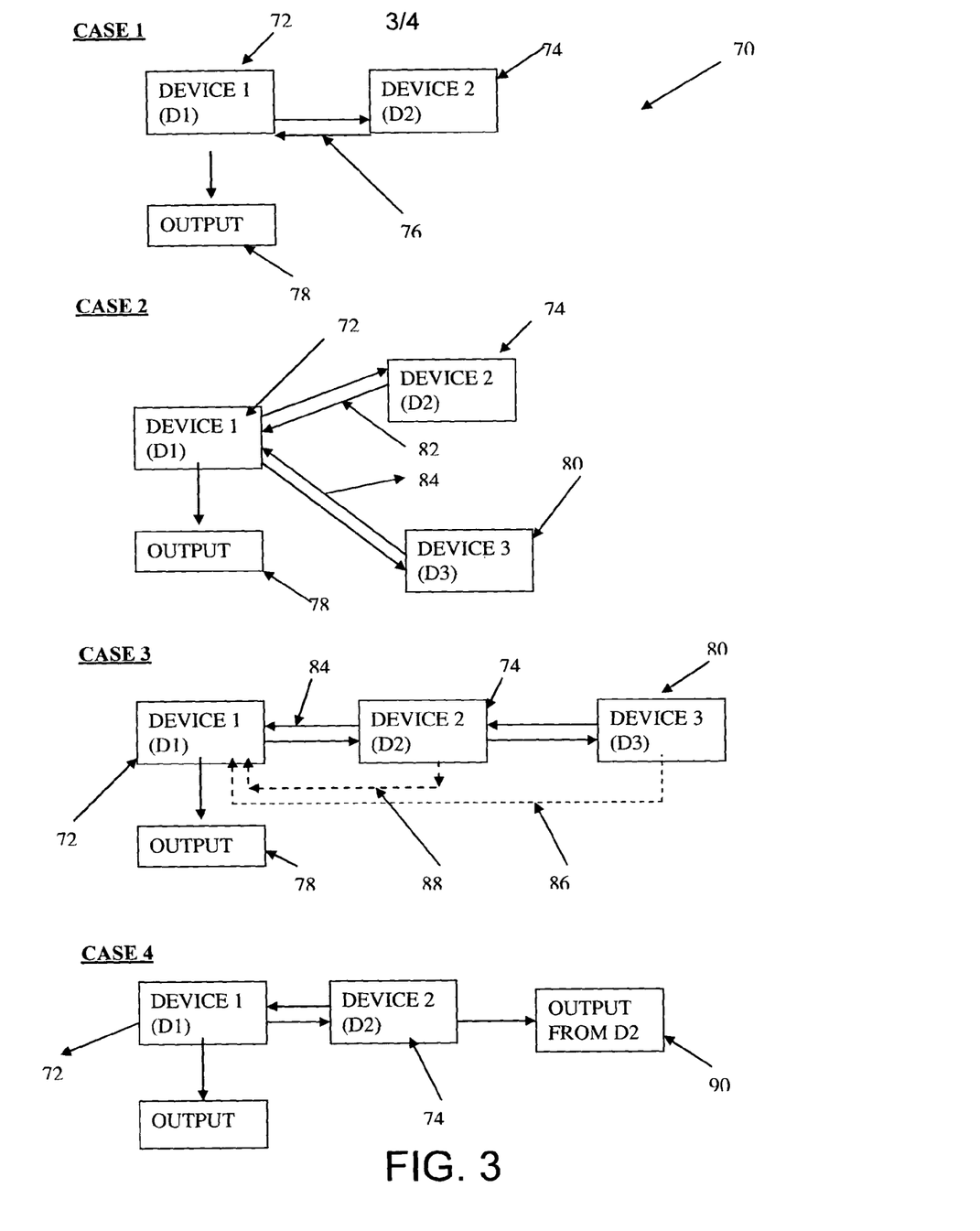
FIG. 3 illustrates some of the exemplary embodiments relating to the allocation of a task among multiple devices, in accordance with an embodiment of the present technique.

FIG. 3 is a block diagram 70 illustrating some of the exemplary embodiments relating to the allocation of the task among the multiple devices, in accordance with an aspect of the present technique. In one embodiment of the present technique represented as case 1 in FIG. 3, the user 26 may initiate the task in device 1 (D1) 72 using the user interface. The task may then be performed in device 2 (D2) 74 and the output 78 sent back to D1 76. The result may be also displayed in D2.

In another embodiment of the present technique represented as case 2 in FIG. 3, the user may initiate the task in D1 72. The task may then be distributed into two jobs based on the capability of the devices. Each of the jobs may then be performed in D2 74 and device D3 80. The output of the jobs may be sent directly to D1 by D2 and D3. This is represented by reference numeral 82 and 84 respectively. The user may then get the output 78 of the task 28 on the user interface of D1 72.

In yet another embodiment of the present technique represented as case 3 in FIG. 3, the task may be initiated by the user in D1 72 and the task transferred from D1 to D2 74. In this scenario, D2 74 may decide to perform part of the task in D3 80. The output 82 generated by D3 may be then transmitted back to D2 and then D2 consolidates the output 82 of D3 and output of D2 to send the final output 84 to D1. It should be noted that in one implementation of the above technique, the output 82 from D3 may also be directly sent to D1. This is represented by reference numeral 86. Likewise, the output from D2 may be directly sent to D1 as represented by reference numeral 88. D1 may consolidate both the results obtained from D2 and D3 and generates the final output 78 of the task 28.

Further, in another embodiment of the present technique represented as case 4 in FIG. 3, the task may be initiated at D1 72 and then may be passed on to D2 74 for execution and the output 90 displayed in D2 74. In this case, the output 90 from D2 may also be sent to D1 and the final output 78 of the task 28 displayed in D1. As will be appreciated by persons skilled in the art that though reference is made to the above mentioned scenarios, any other similar scenarios known in the art may also be applicable using the present technique.

Figure 4:
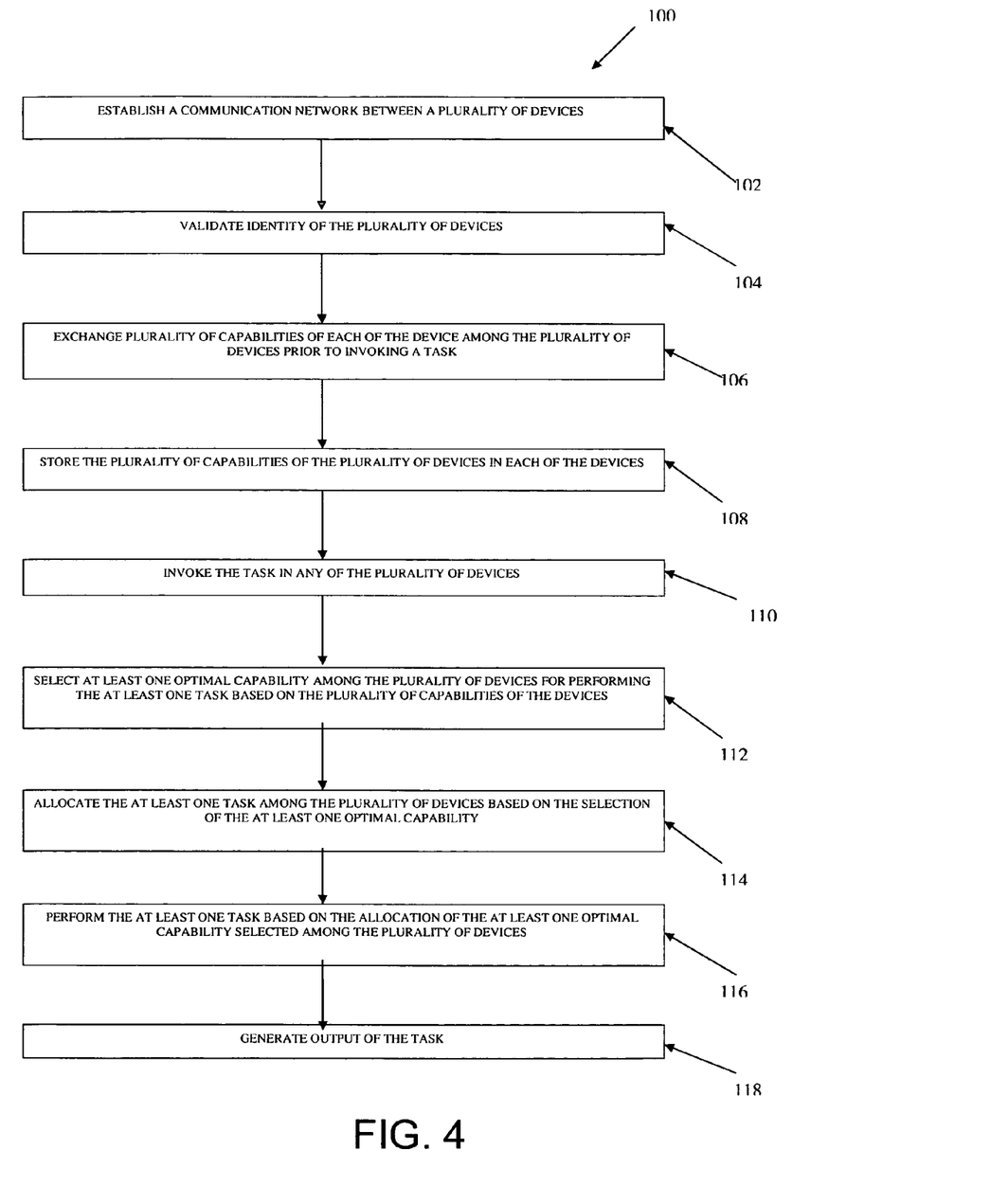
FIG. 4 is a flow diagram illustrating a method of executing at least one task via a communication network, in accordance with an embodiment of the present technique.

FIG. 4 is a flow diagram illustrating a method 100 of executing at least one task via a communication network, in accordance with an embodiment of the present technique. As illustrated in FIG. 4, the method 100 proceeds in step 102 by establishing the communication network between multiple devices. As mentioned earlier, communication network may be fixed or wireless or a combination thereof. The networking between the devices may be peer to peer (ad-hoc) i.e. devices directly connecting to each other or infrastructure based (devices communication via some infrastructure element like an access point in case of wireless LANS. Further, for a wireless communication network, two or more devices may establish communication if even they are connected to different access points.

Access point refers to radio coverage area or a region provided by a server for detecting at least one device and are operable to allow the at least one device to provide a connection with the access point for establishing the communication network. The method 100 continues in step 104, wherein the identity of the devices is validated and the pre-specified access is verified. This may be executed by the security module disposed in the device. At step 106, the capabilities of the at least one device may be exchanged between the multiple devices. The sharing of information may be stored in the storage module in the XML schema.

It should be noted that this exchange of information may be completed before the initiation of the task. However, in certain implementation of the present technique, the exchange of information may be quickly exchanged after the initiation of the task. In another implementation of the present technique, the task may be executed based on the information, which was stored in the storage module during some past execution of the task. The past record, which was stored in the storage module, may be used to utilize the capabilities of the various devices for the execution of the task. In certain implementation of the present technique, the information on the capabilities of the devices are randomly exchanged and updated and the updated information may be then stored in the storage module present in each of the devices.

The method continues in step 108, where the information of the capabilities, which are exchanged between multiple devices are stored in the storage module. At step 110, the task may be invoked in any of the devices by the at least one user via the user interface. It should be noted that in certain implementation of the present technique, the task may be initiated in one device but the execution of the task may occur in any of the devices. In that case, the user may not always initiate the task using the user interface but the task may be automatically executed in a combination of devices depending on the optimal capability required for performing the task.

At step 112, the resource module present in the device selects the at least one optimal capability from the multiple devices for performing the task. The selection is based on the capabilities of the at least one device, which is stored in the stored module.

Furthermore, the method 100 continues in step 114, wherein the task is allocated among the multiple devices based on the selection of the at least one optimal capability. This is generally executed by the decision module present in the device. It should be noted that a task may be distributed into number of parts depending on the availability and capability of the multiple devices. In one embodiment of the present technique, the allocation of task among the multiple devices may be executed depending on the load of task in each of the devices. In another embodiment of the present technique, the allocation of task among the devices may depend on the capabilities available at that point of time.

As will be appreciated by those skilled in the art, the allocation of a task among the multiple devices may occur in any of the devices at any point of time. In addition to this, the allocation of the task among multiple users may also be done manually instead of automatically allocating the task. In this case, the user may distribute the task among various devices depending on the capabilities of the device and then execute the task manually at each device. It should be noted that in certain embodiment of the present technique, the allocation of task may be based on non-task execution parameters also.

By way of an exemplary example, if a task is initially allocated in two parts (say, T1 and T2) between device 1 and device 2 respectively, then device 2 in executing task T2 may further allocate part of the task T2 among one or more devices. For example, the task T2 may be again distributed into T3 and T4 among device 3 and device 4. However, the output of the particular task in full or in parts is sent back to the initial device, which allocated the task. In the above example, the output of T3 and T4 are sent to device 2 and the output of device 2 is sent to the initial device, through which the user initiated the task. In this way, the device, which initiated the task, acquires the final output of the task, no matter how it may have been allocated among the various devices. The output of the task may be displayed to the user using the user interface. As will be appreciated by those skilled in the art, the above exemplary embodiment merely illustrates one such possibility and may not be considered as a limiting example. Any other similar scenario known in the art may also be possible using the present technique.

At step 116, the task may be performed based on the allocation of the at least one optimal capability selected among the multiple devices. This may be usually done by the execution module. The execution module receives all the data from the various devices and process the final output before displaying the output in the user interface. The method finally at step 118, generates the final output of the task on the device, which invoked the task. In one embodiment of the present technique, the output may be generated in the user interface of the device, which initiated the task. In another embodiment of the present technique, the output of the task may be generated in each of the device, which performed the task or the job based on the allocation of the task among the multiple devices. In yet another embodiment of the present technique, the output of the task may be generated in any device, which participated in performing the task or the job.

It should be noted that in one embodiment of the present technique, the user may get a snapshot view of the capabilities of all the devices at any point of time. This provides the user to choose the optimal capability during manual allocation of task among various devices. In addition to this, this may guide the user on the capabilities available to execute a particular task.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The sequence of instructions as explained in the method steps may include but not limited to, program code adapted for establishing the communication network between multiple devices. The sequence of instruction further include program code adapted for exchanging the capabilities of the at least one device prior to invoking the task. It also includes program code adapted for selecting at least one optimal capability for performing the task based on the capabilities of the devices. The sequence of instruction further includes program code adapted for allocating the task among the devices based on the selection of the at least one optimal capability and a program code adapted for performing the task based on the allocation of the at least one optimal capability among the devices.

In one embodiment of the present technique, the sequence of instruction may include program code adapted for storing information of the capabilities of the at least one capability in the storage module disposed in each of the devices. In another embodiment of the present technique, the sequence of instruction may include program code adapted for automatically updating the information of the capabilities of the multiple devices using the storage module. In yet another embodiment of the present technique, the sequence of instruction may include program code adapted for providing authentication mechanism to validate identity of multiple devices prior to executing the task. This may be generally executed using the security module disposed in each of the devices.

As will be appreciated by a person skilled in the art, the various implementations of the present technique provide a variety of advantages. For example, the system allows seamless discovery of services without any user intervention. This discovery happens immediately on entering a mobile network (also defined as smart space) allowing the user access to the list of available services prior to task execution itself. In addition to the services offered by the devices in the smart space, the capabilities of these devices such as available memory, current load, processor speed etc may also be exchanged allowing users or the applications to make a more informed choice on the end device on which execution of the task takes place. As indicated earlier, an exemplary example of the task may include a collaborative work application which uses a mechanism to edit a group document by providing a voice input for editing, which gets broken down to "converting a voice input to text" and passing of the resultant text to another device which provides the service for interpreting the commands and integrating the user inputs with the group document.

While, the following description id presented to enable a person of ordinary skill in the art to make and use the invention provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

Many modifications of the present invention will be apparent to those skilled in the arts to which the present invention applies. Further, it may be desirable to use some of the features of the present invention without the corresponding use of other features.

Accordingly, the foregoing description of the present invention should be considered as merely illustrative of the principles of the present invention and not in limitation thereof.

We claim:

1. A system for executing at least one task via a communication network, comprising:
    a plurality of devices configured to establish the communication network, wherein at least two of the plurality of devices are wireless mobile devices which each comprise:
        a database storing at least one capability of one or more of the plurality of devices in the communication network to execute at least a portion of a task;
        a resource module adapted to select at least one optimal capability in the one or more devices to perform the at least a portion of the task;
        a decision module adapted to allocate the at least a portion of the task to one or more designated devices among the plurality of devices based on the selection of the at least one optimal capability of the plurality of devices; and
        an execution module in the one or more designated devices adapted to perform the allocated at least a portion of the task, wherein the one or more designated devices provides at least a portion of a final output upon completing the allocated at least a portion of the task; and
    wherein the at least one capability is exchanged among the plurality of devices prior to invoking the at least a portion of the task.

2. The system according to claim 1, wherein the at least one capability of the devices comprising at least one of an application resource or a non task execution parameters or combinations thereof.

3. The system according to claim 1, wherein the communication network includes at least one of an ad-hoc communication network, or a fixed network, or combinations thereof.

4. The system according to claim 1, wherein the plurality of devices include at least one of a mobile device or a fixed device or combinations thereof.

5. The system according to claim 1, further comprising a storage module disposed in the plurality of devices, wherein the storage module is adapted to store information on the at least one capability of the plurality of devices.

6. The system according to claim 5, wherein the storage module is adapted to automatically update the information on the at least one capability of the plurality of devices.

7. The system according to claim 5, wherein the information on the at least one capability of the plurality of devices is stored in the storage module in an extensible markup language (XML) schema.

8. The system according to claim 7, wherein the allocation of the at least one task among the plurality of devices occurs via the extensible markup language (XML) schema.

9. The system according to claim 1, further comprising a user interface module disposed in the plurality of devices and configured to provide a snapshot of the at least one capability of the plurality of devices.

10. The system according to claim 1, wherein the decision module is adapted to periodically update the allocation of the at least one optimal capability of the plurality of devices for performing the at least one task.

11. The system according to claim 1, further comprising a security module disposed in the plurality of devices, wherein the security module is adapted to provide an authentication mechanism to validate an identity of one or more of the plurality of devices prior to executing the at least one task.

12. A method for executing at least one task via a communication network, comprising:
    establishing the communication network between a plurality of devices, wherein at least two of the plurality of devices each comprise a database storing at least one capability of the plurality of devices and wherein the plurality of devices are adapted for executing a predefined set of activities indicative of the at least one task;
    exchanging the at least one capability among the plurality of devices prior to invoking the at least one task;

selecting at least one optimal capability among the stored at least one capability of the plurality of devices for performing the at least one task via a resource module;

allocating the at least one task among the one or more designated devices of the plurality of devices based on the selection of the at least one optimal capability via a decision module; and performing the at least one task by the one or more designated devices based on the allocation of the at least one optimal capability among the plurality of devices via an execution module, wherein at least a portion of a final output associated with the allocated the at least one task is provided by the one or more designated devices.

13. The method according to claim 12, further comprising storing information on the at least one capability of the plurality of devices in a storage module disposed in the plurality of devices.

14. The method according to claim 13, further comprising automatically updating the information on the at least one capability of the plurality of devices using the storage module.

15. The method according to claim 13, wherein the information on the at least one capability of the plurality of devices is stored in the storage module in an extensible markup language (XML) schema.

16. The method according to claim 12, further comprising providing a snapshot of the at least one capability of the plurality of devices via a user interface module.

17. The method according to claim 12, further comprising dividing the at least one task into a plurality of jobs and performing each of the jobs in any of the plurality of devices.

18. The method according to claim 17, further comprising displaying output of the plurality of jobs on any of the plurality of devices.

19. The method according to claim 17, further comprising compiling the output of the plurality of jobs executed in the any of the plurality of devices for performing the task.

20. The method according to claim 12, further comprising periodically updating the allocation of the at least one optimal capability among the plurality of devices for performing the at least one task using the decision module.

21. The method according to claim 12, further comprising allocating the at least one optimal capability among the plurality of devices based on a non-task execution parameter.

22. The method according to claim 12, wherein the resource module further comprises manually selecting the at least one optimal capability among the plurality of devices for performing the at least one task.

23. The method according to claim 12, wherein the communication network includes at least one of an ad-hoc communication network, or a fixed network, or combinations thereof.

24. The method according to claim 12, further comprising providing an authentication mechanism to validate identity of the plurality of devices prior to executing the at least one task using a security module disposed in the plurality of devices.

25. A non-transitory computer readable medium storing program code which when executed on a computer processor is adapted for performing a method comprising:

establishing the communication network between a plurality of devices, wherein at least two of the plurality of devices each comprise a database storing at least one capability of the plurality of devices and wherein the plurality of devices are adapted for executing a predefined set of activities indicative of the at least one task;

exchanging the at least one capability of the plurality of devices prior to invoking the at least one task;

selecting at least one optimal capability among the stored at least one capability of the plurality of devices for performing the at least one task via a resource module;

allocating the at least one task to one or more designated devices based on the selection of the at least one optimal capability via a decision module; and performing the at least one task by the one or more designated devices based on the allocation of the at least one optimal capability among the plurality of devices via an execution module, wherein the one or more designated devices provide at least a portion of a final output associated with the at least one task performed.

26. The computer readable medium according to claim 25, wherein the program code is further adapted for storing information on the at least one capability in a storage module disposed in the plurality of devices.

27. The computer readable medium according to claim 26, wherein the program code is further adapted for automatically updating the information on the at least one capability of the plurality of devices using the storage module.

28. The computer readable medium according to claim 25, wherein the program code is further adapted for; providing a snapshot of the at least one capability of the plurality of devices via a user interface module.

29. The computer readable medium according to claim 25, wherein the program code is further adapted for periodically updating the allocation of the at least one optimal capability among the plurality of devices for performing the at least one task.

30. The computer readable medium according to claim 25, wherein the program code is further adapted for allocating the at least one optimal capability among the plurality of devices based on a non-task execution parameter.

31. The computer readable medium according to claim 25, wherein the program code is further adapted for distributing the at least one task among the plurality of devices based on the at least one capability of the plurality of devices.

32. The computer readable medium according to claim 25, wherein the program code is further adapted for providing an authentication mechanism to validate identity of the plurality of devices prior to executing the at least one task using a security module disposed in the plurality of devices.

33. The computer readable medium according to claim 25, wherein the program code is further adapted for dividing the at least one task into a plurality of jobs and performing each of the jobs in any of the plurality of devices.

34. The computer readable medium according to claim 33, wherein the program code is further adapted for displaying the output of the plurality of jobs on any of the plurality of devices.

35. A device configured to establish a communication network with at least one other like device for the execution of at least one task via the communication network, the device comprising:

a database storing at least one capability of a plurality of devices, wherein:
the plurality of devices comprises the device and the at least one other like device;
the plurality of devices are adapted for executing a predefined set of activities indicative of the at least one task; and
the at least one capability is exchanged among the plurality of devices prior to an invoking of the at least one task;

a resource module adapted to select at least one optimal capability among the stored at least one capability of the plurality of devices for performing the at least one task based on the at least one capability of the plurality of devices;

a decision module adapted to allocate the at least one task to one or more designated devices based on the selection of the at least one optimal capability among the plurality of devices; and an execution module adapted to perform the at least one task in the one or more designated devices based on the allocation of the at least one optimal capability among the plurality of devices, wherein the one or more designated devices output a final output associated with the at least one task performed.

36. The device according to claim 35, wherein the at least one capability of the plurality of devices comprises at least one of an application resource or a non task execution parameters or combinations thereof.

37. The device according to claim 35, wherein the communication network includes at least one of an ad-hoc communication network, or a fixed network, or combinations thereof.

38. The device according to claim 35, wherein the plurality of devices include at least one of a mobile device or a fixed device or combinations thereof.

39. The device according to claim 35, further comprising a storage module adapted to store information on the at least one capability of the plurality of devices.

40. The device according to claim 39, wherein the storage module is adapted to automatically update the information on the at least one capability of the plurality of devices.

41. The device according to claim 39, wherein the information on the at least one capability of the plurality of devices is stored in the storage module in an extensible markup language (XML) schema.

42. The device according to claim 41, wherein the allocation of the at least one task among the plurality of devices occurs via the extensible markup language (XML) schema.

43. The device according to claim 35, further comprising a user interface module configured to provide a snapshot of the at least one capability of the plurality of devices.

44. The device according to claim 35, wherein the decision module is adapted to periodically update the allocation of the at least one optimal capability of the plurality of devices for performing the at least one task.

45. The device according to claim 35, further comprising a security module adapted to provide an authentication mechanism to validate identity of the plurality of devices prior to executing the at least one task.

\* \* \* \* \*